(12) United States Patent
Gruhler et al.

(10) Patent No.: US 8,214,994 B2
(45) Date of Patent: Jul. 10, 2012

(54) METHOD FOR SEPARATION BY CRACKING, AND CRACKING UNIT

(75) Inventors: Siegfried Gruhler, Vöhringen-Wittershausen (DE); Joachim Klein, Oberndorf-Aistaig (DE); Bernhard Wössner, Lossburg (DE)

(73) Assignee: Mauser Werke Oberndorf Maschinenbau GmbH, Oberndorf (DE)

( * ) Notice: Subject to any disclaimer, the term of this patent is extended or adjusted under 35 U.S.C. 154(b) by 970 days.

(21) Appl. No.: 11/816,904

(22) PCT Filed: Jan. 27, 2006

(86) PCT No.: PCT/DE2006/000129
§ 371 (c)(1),
(2), (4) Date: Jul. 14, 2008

(87) PCT Pub. No.: WO2006/089500
PCT Pub. Date: Aug. 31, 2006

(65) Prior Publication Data
US 2009/0205186 A1    Aug. 20, 2009

(30) Foreign Application Priority Data

Feb. 22, 2005 (DE) .......................... 10 2005 008 204
Mar. 15, 2005 (DE) .......................... 10 2005 011 843

(51) Int. Cl.
*B23P 19/04* (2006.01)
*B65H 3/02* (2006.01)
(52) U.S. Cl. ...................................... 29/426.4; 225/103
(58) Field of Classification Search ................. 29/426.4, 29/426.1, 426.5, 724, 725, 403.1, 403.3; 225/103, 93
See application file for complete search history.

(56) References Cited

U.S. PATENT DOCUMENTS 5,911,349 A * 6/1999 Wiesemann et al. .......... 225/103
6,698,637 B2 * 3/2004 Hahnel et al. .................. 225/96

FOREIGN PATENT DOCUMENTS

| DE | 199 11 598 | 9/2000 |
|---|---|---|
| WO | WO95/28248 | 10/1995 |
| WO | WO98/33616 | 8/1998 |
| WO | WO00/13833 | 3/2000 |
| WO | WO00/64616 | 11/2000 |

* cited by examiner

*Primary Examiner* — John C Hong
(74) *Attorney, Agent, or Firm* — Boyle Fredrickson S.C.

(57) ABSTRACT

A method for separating a bearing channel of a housing by cracking. The bearing covers of the bearing channel are separated from the housing by cracking by means of a cracking mandrel. The steps include clamping the housing at the top thereof so that the bearing channel is downwardly oriented, i.e., towards a supporting or clamping surface of the housing and supporting the bearing cover during separation by cracking by means of a counter bracket.

18 Claims, 6 Drawing Sheets

METHOD FOR SEPARATION BY CRACKING, AND CRACKING UNIT

BACKGROUND OF THE INVENTION

1. Field of the Invention

The invention relates to a method for separating a bearing channel of a housing by cracking and a cracking unit by which such separation by cracking can be carried out.

2. Discussion of the Related Art

The separation by cracking of connecting rods of an internal combustion engine has been employed for quite a long time already. In the connecting rod top end to be separated by cracking two diametrally disposed notches predetermining the separating plane by cracking are introduced by means of laser. Subsequently the connecting rod top end is separated by cracking by a cracking mandrel and a cover is separated from the connecting rod. This cracking method has practically been prevailing as standard worldwide.

During the past few years, apart from the afore-described connecting rods also housings provided with bearing arrangements, for instance a crankcase of an internal combustion engine, have been started to be separated by cracking, wherein the bearing covers of a bearing channel supporting a crankshaft are separated from a respective bearing block formed on the housing. A method of this type is described in DE 199 11 598 A1. A cracking mandrel by which a cracking force is applied to the bearing cover is introduced into the bearing channel, wherein the cracking plane is in turn predetermined by notches introduced by means of laser energy or broaching.

During the finish of both connecting rods and housings an excessive deformation in the area of the separating plane by cracking can be avoided when the separated bearing cover or, for instance during connecting rod cracking, the connecting rod cover are supported.

Especially during the finish of housings including a bearing channel in which a plurality of bearing covers have to be separated from the allocated bearing blocks, a problem consists in allocating the separated bearing covers to the corresponding bearing blocks after the separation by cracking. In the solution known from DE 199 11 598 A1 the bearing covers are supported during a separating operation by cracking by means of a reinforcing means bridging the bearing cover which is screwed into the bearing cover and the bearing block by studs. After separation by cracking this reinforcing means has to be removed by loosening the studs so that the then loose bearing covers subsequently have to be attached again. For this allocation of the bearing covers to the respective bearing block considerable process expenditure is necessary which makes the manufacture of the housing more expensive. Moreover, it is also extremely complicated to fix the reinforcing means by means of the bearing bolts, which further increases the manufacturing costs.

SUMMARY OF THE INVENTION

Compared to this, the object underlying the invention is to provide a method in which the expenditure in terms of process and apparatus is reduced compared to the conventional solutions.

This object is achieved, as regards the method, by the features of claim 1 and, as regards the cracking unit, by the features of the independent claim 10.

In the method according to the invention and the cracking unit according to the invention the housing to be separated by cracking is clamped at the top thereof so that the bearing channel with the bearing covers still formed integrally with the housing is downwardly oriented toward a supporting surface for the housing. Accordingly, also the bearing cover is supported during separation by cracking by means of a counter bracket from the bottom, i.e. from the supporting surface so that such counter brackets may have a very compact design and no construction space is lost above the housing. The bearing covers can then be positioned very easily in the clamping area.

According to the invention, for the relative positioning of the bearing covers with respect to the bearing blocks of the housing there are two alternatives. In accordance with a first alternative, the studs later required for bearing are screwed into the bearing covers/bearing blocks before separation by cracking so that the bearing covers remain on the allocated bearing block even after separation by cracking. In this variant, the counter bracket preferably acts upon the screw heads of the studs. It is preferred when a counter bracket acting upon two respective studs is allocated to each bearing cover.

In such variant it is especially advantageous when the bearing covers are successively separated by cracking, wherein the screwing of the respective bearing cover to be separated by cracking is somewhat loosened before the separating operation by cracking so that a predetermined play is adjusted which determines the support of the bearing cover during the separating operation by cracking. In an especially preferred embodiment this loosening of the studs is performed through the respective counter bracket.

In this variant, all counter brackets are simultaneously actuated, wherein only those counter brackets get to the two screwed out studs in supporting position and are spaced apart from the remaining studs of the bearing covers not yet separated by cracking. After separation by cracking the studs are tightened again so that the counter bracket is spaced apart from these studs also during the next separating operation by cracking.

In an alternative variant, the screwing during the separating operation by cracking is dispensed with and below the housing a basket is arranged into which the bearing covers fall during separation by cracking. This basket is designed such that the bearing covers are kept at a predetermined relative position with respect to the bearing blocks of the bearing channel.

The basked can be fastened to the housing or can serve as a container for the housing.

In an especially preferred embodiment the cracking unit is designed to have a multi-part cracking mandrel, wherein a cracking head is positively connected to a cracking lance by radial insertion. Radially outer side walls of the cracking head overlap and engage from behind a central section of the cracking lance so that this connection between the cracking head and the cracking lance withstands also maximum loads. Moreover, with this design the cracking mandrel can be easily adapted to different geometries of the housing by exchanging the cracking head.

In a preferred embodiment the cracking head has a cracking jaw which is biased into its radially retracted home position by means of a spring or a spring arrangement and can be extended in radial direction by means of a slide.

The length of the entire cracking mandrel can correspond approximately to the axial length of the bearing channel so that all bearing covers can be successively separated by cracking by introducing the cracking mandrel step by step from one side. As an alternative, the length of the cracking mandrel can correspond approximately to half of the bearing channel so that after separating the bearing covers by cracking the housing has to be rotated about 180° at one housing side so as to separate the remaining bearing covers of the bearing channel by cracking.

Due to the high cracking forces the cracking jaws might be blocked. They can be easily released by applying a push-off tool to the end face of the cracking head.

Especially in the case of cracking mandrels having a small diameter it may be advantageous when the same are guided through an additional guiding means during immersion into the bearing channel.

The method according to the invention and the cracking unit according to the invention can be applied of particular advantage in a crankcase or a camshaft bearing channel.

The notches are preferably introduced by laser energy.

Other advantageous further embodiments of the invention are the subject matter of further dependent claims.

BRIEF DESCRIPTION OF THE DRAWINGS

Hereinafter a preferred embodiment of the invention will be illustrated in detail by way of schematic drawings in which.

DETAILED DESCRIPTION OF THE INVENTION

Figure 1:
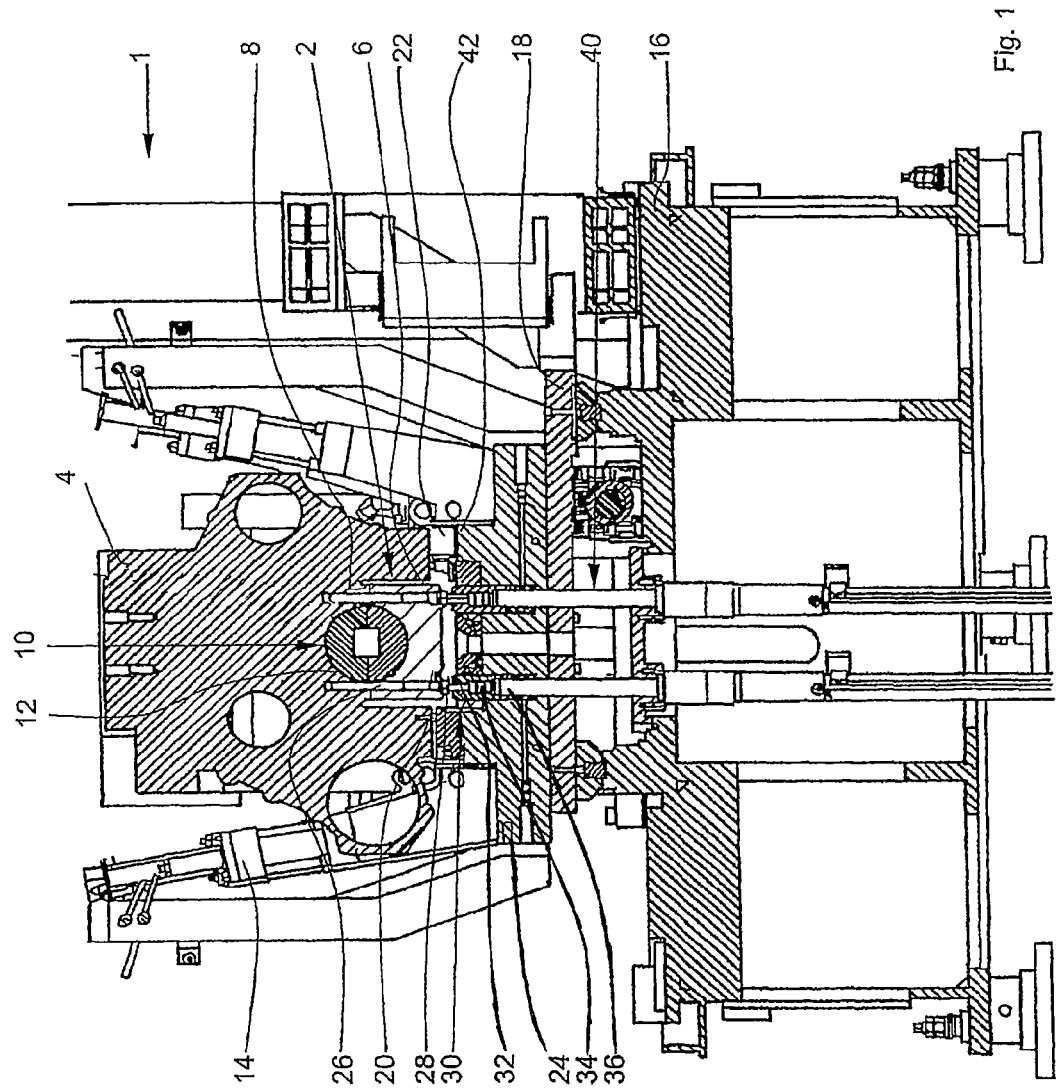
FIG. 1 shows a sectional view of a cracking unit for a crankcase of an internal combustion engine.

FIG. 1 shows a sectional view of a cracking unit 1 for separating a bearing arrangement or bearing channel 2 of a crankcase 4 by cracking, in the sectional view according to FIG. 1 merely one bearing cover 6 including the pertinent bearing block 8 being shown. According to FIG. 2, which shows a cut side view of a cracking head of the cracking unit 1, the crankcase 4 of a six-cylinder engine is concerned, wherein for supporting the crankshaft the bearing channel 2 is formed by 7 bearing sections axially arranged in series and each exhibiting a bearing cover 6 and a bearing block 8. The bearing cover 6 is initially formed integrally at the crankcase 4 and is separated by cracking in the cracking unit 1 by means of a cracking mandrel 10 shown in section in the Figure. The cracking plane between the bearing cover 6 and the bearing block 8 is predetermined by notches in the bearing hole 12 arranged diametrally with respect to each other. In the described embodiment these notches are introduced by a laser. On principle, the notches can also be mechanically manufactured by broaching or the like, wherein the broaching tool may be integrated in the cracking mandrel 10.

According to FIG. 1, the crankcase is clamped at the top thereof by means of a clamping cylinder 14 onto a bench 18 guided along a frame 16 of the cracking unit 1, the clamping position being predetermined by positioning pins 20 and other supporting members 20 formed at a clamping means 24 mounted on the bench 18.

In the shown embodiment the two allocated bearing bolts or bearing screws 26 are screwed into the bearing cover 6 and the bearing block 8 before separation by cracking so that the screw heads 28 thereof are positioned on the end face of the bearing cover at the bottom in FIG. 1. These screw heads 28 are designed to have a conventional hexagon drive and a hexagon socket or the like so that a screwing unit can act both upon the outer circumference and upon the hexagon socket.

In order to avoid an excessive plastic deformation of the separating plane during the separating operation by cracking, the bearing cover 6 is supported during separation by cracking by means of a counter bracket 30 acting upon the screw heads 28. This counter bracket comprises counter bracket heads 32 allocated to a respective bearing screw 28 and movable in axial direction which can be displaced in vertical direction (view according to FIG. 1) via a spline 34 and an appropriately centrally controlled displacing means 36 in order to bring them into contact with the screw head 28 and to permit a travel-dependent support during separation by cracking.

It is a particular feature of the embodiment shown in FIG. 1 that the cracking unit 1 is provided with an integrated screwing unit 40 the screwdrivers 42 of which extend axially through the allocated counter bracket head 32 and can be fixedly engaged with the hexagon socket or the like so as to tighten or loosen the allocated bearing screw 26. In the shown embodiment the screwing unit 40 is appropriately provided with two electric screwdrivers 42 each of which passes through one of the two counter bracket heads 32 and can be brought into contact with the two bearing screws 26.

In the embodiment shown in FIG. 1 the two bearing screws 26 are initially fed and screwed completely automatically via a separate screwing unit V, which is not shown, before the crankcase 4 is clamped at the top thereof. In the next manufacturing step the crankcase 4 is rotated about 180° into the overhead position and is clamped on the clamping means 24 by means of the clamping cylinders 14. After that, the cracking mandrel 10 is inserted in the bearing hole 12 of the bearing section adjacent to the cracking mandrel 10 and the bearing screws 26 of this bearing section are somewhat loosened by the screwing unit so that a predetermined play is adjusted. During subsequent separation by cracking the counter bracket heads 32 are extended via the spline 34, wherein in the shown cracking unit two counter bracket heads 32 are allocated to each bearing cover 6 of the bearing arrangement all of which are simultaneously extended. However, the lift is adjusted such that the counter bracket head 32 only hits those screw heads 28 which were loosened by the afore-mentioned play via the screwing unit 40. I.e. the further counter brackets are not engaged. The counter brackets 32 supporting the two screw heads 28 apply a constant supporting force so as to render the cracking course along the separating surface between the bearing cover 6 and the bearing block 8 uniform, wherein the adjusted axial play of the bearing screws 26 permits the separating operation by cracking, but the bearing covers remain at their predetermined position relative to the bearing block 8 after separation by cracking. The separating surface by cracking is then blown out by compressed air after further loosening the screwing and then the screwing is slightly tightened again.

In a subsequent working cycle the crankcase 4 can then be rotated about 180° and the bearing screws 26 can be tightened to their yield point, which is done by a further separate screwing unit of the system.

Figure 2:
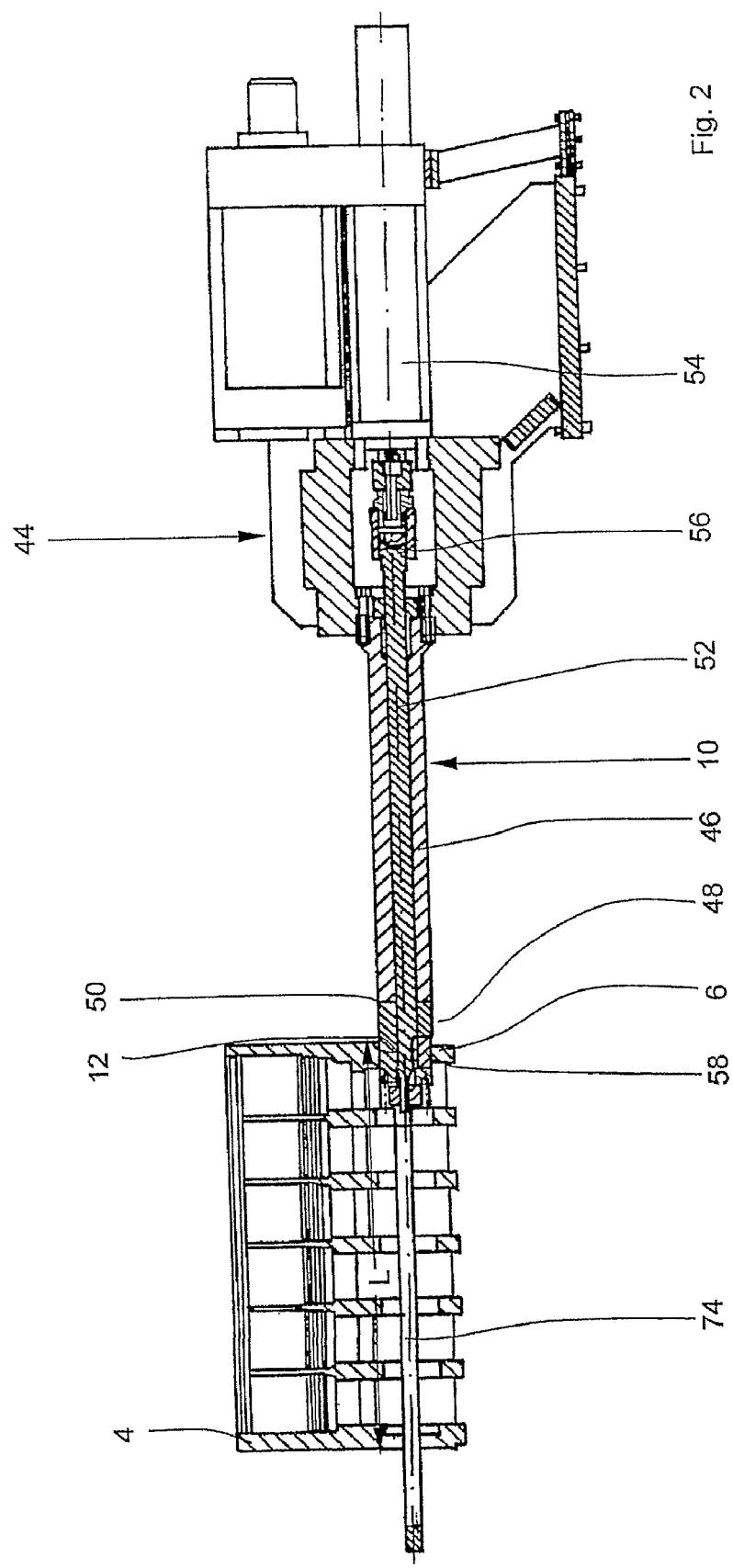
FIG. 2 is a sectional view of a cracking head of the cracking unit from FIG. 1.

FIG. 2 illustrates a cut side view of the afore-mentioned cracking head 44 of the cracking unit 1 shown in front view in FIG. 1. Accordingly, the cracking mandrel 10 of the cracking head 44 is designed in two parts having a cracking lance 46 and a cracking tool 48 which are positively connected to each other by a positive connection 50 explained in more detail hereinafter. In the cracking tool 48 and in the cracking lance 46 a sliding mandrel 52 is guided which is movable in axial direction with respect to the bearing channel 2 by means of a cracking cylinder 54.

The unit comprising the cracking cylinder 54, the cracking mandrel 10 and the interposed coupling means 56 is supported on the frame 16 of the cracking unit 1. As shown in FIG. 2, for separating the bearing cover 6 on the right in FIG. 2 of the crankcase 4 by cracking the cracking tool 48 immerses into the bearing hole 12 of this bearing section, wherein a cracking jaw 58 of the cracking tool 48 is then displaced radially outwardly by axial displacement of the sliding mandrel 52 and the bearing cover 6 is separated by cracking.

Figure 3:
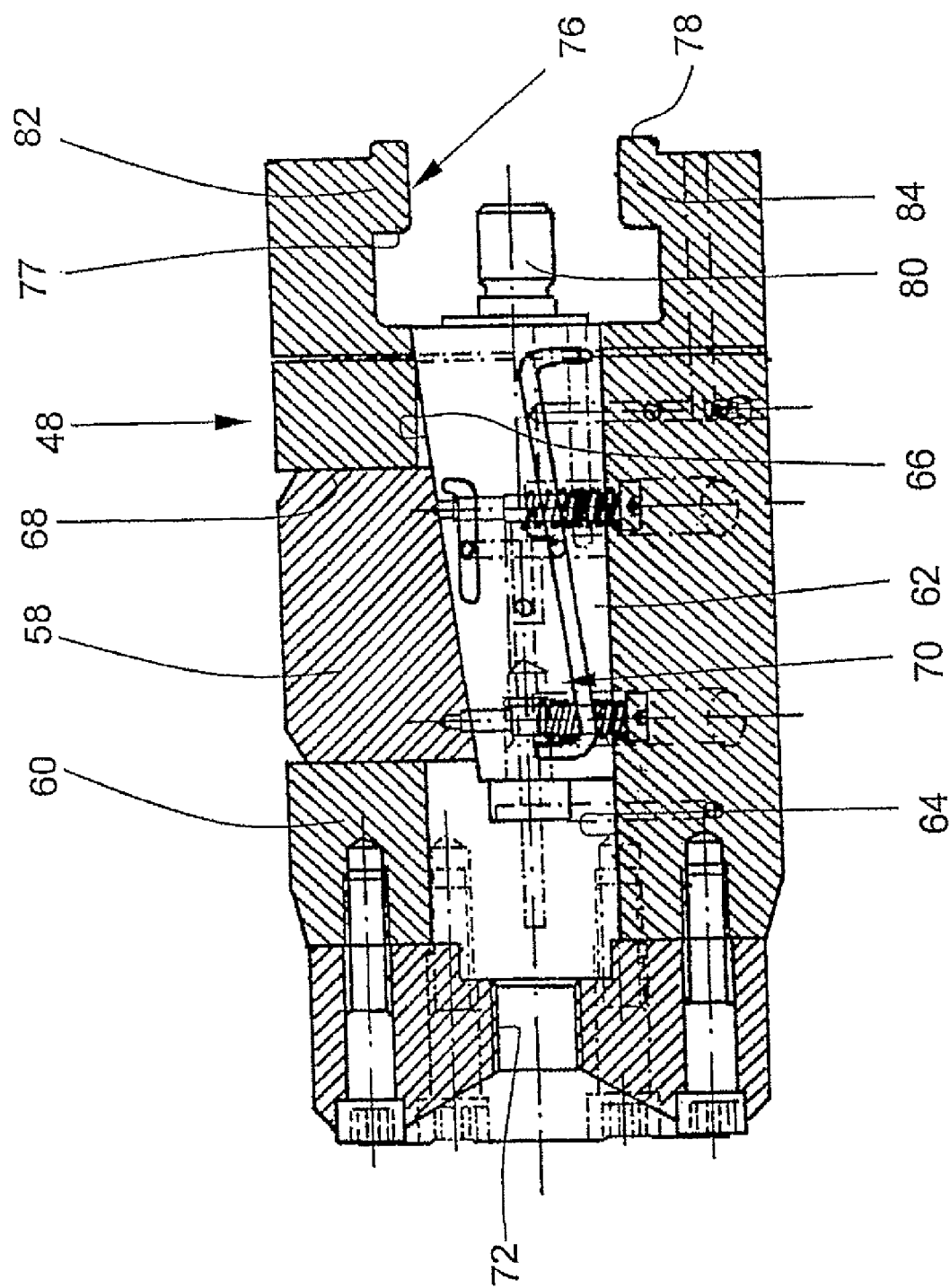
FIG. 3 is a detailed representation of a cracking tool of a cracking mandrel.

Details of the cracking tool 58 are illustrated by way of FIG. 3. Accordingly, the cracking tool 48 includes a head sleeve 60 in the sleeve guide 64 of which a wedge 62 is guided to be axially movable. The latter is guided with its outer circumference along the internal sleeve guide 64 and with its wedge surface located on top in FIG. 3 is adjacent to the cracking jaw 58 which is guided to be radially movable in a shell breakthrough 68 of the head sleeve 60. The cracking jaw 58 is biased in a contacting position against the wedge 62 via a spring arrangement 70.

At the end section of the head sleeve 60 on the left in FIG. 3 a seat 72 for attaching a push-off tool 74 (cf. FIG. 2) is provided by which a blocked cracking tool 48 can be freed off again. At the right end section of the head sleeve 60 a part of the afore-described connection 50 to the cracking lance 46 is formed. This connection is positive and in the shown embodiment it is formed by a lock nut 76 passing through the right end section of the head sleeve 60 which extends toward the wedge 62 so that an undercut 78 is formed.

At the end face of the head sleeve 60 moreover tangential projections 78 immersing into corresponding recesses of the cracking lance 46 are formed on both sides of the opening area of the lock nut 76.

The wedge 62 has a connecting bolt 80 which immerses into the lock nut 76 in the shown normal state. This connecting bolt 80 can be inserted, guaranteeing tensile strength, in a correspondingly formed front seat of the sliding mandrel 52 so as to transmit the lift of the cracking cylinder 54 to the cracking jaw 58.

Figure 4:
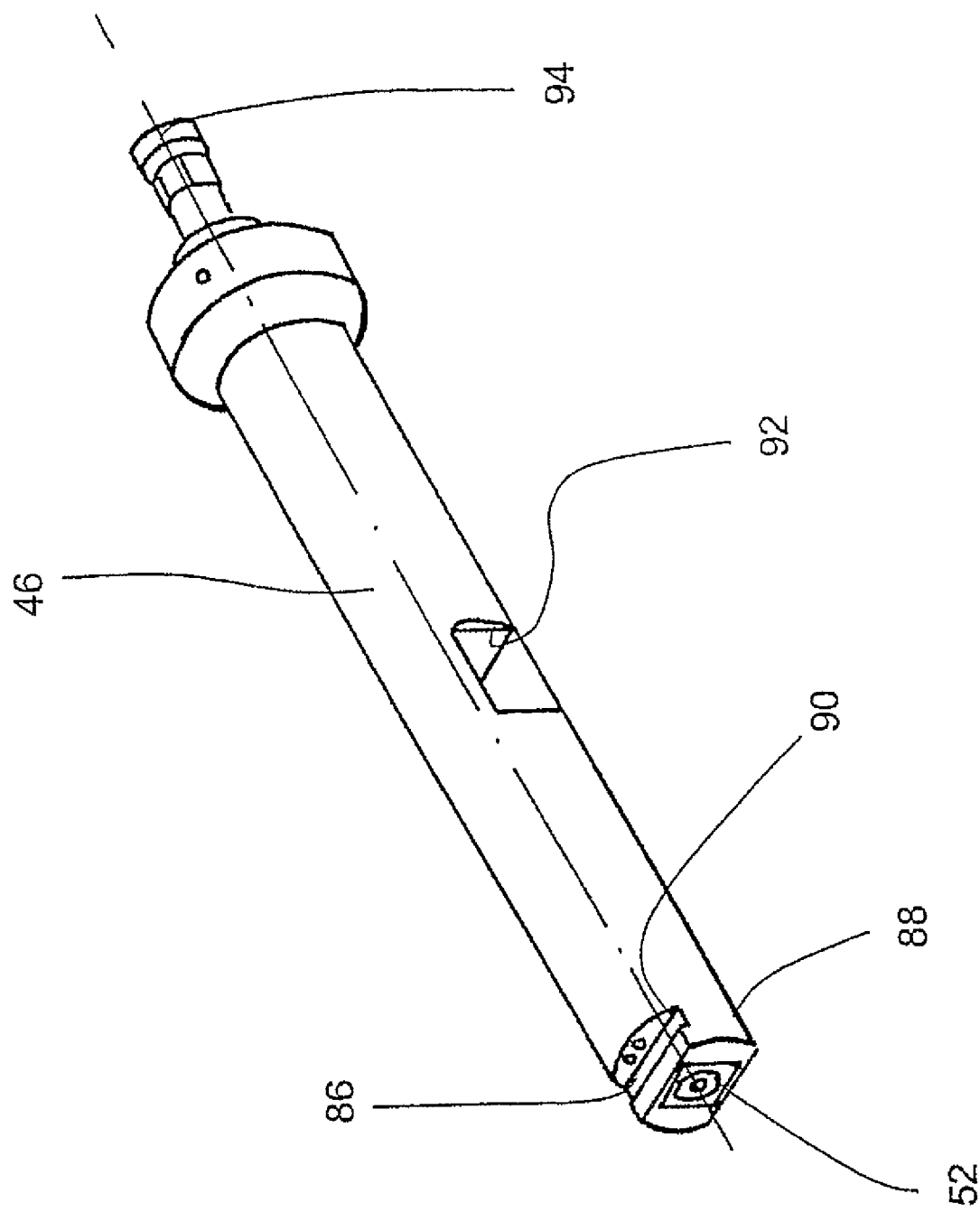
FIG. 4 is a cracking lance of the cracking mandrel.

FIG. 4 shows a three-dimensional view of the cracking lance 46. Accordingly, the end section facing the cracking tool 48 is designed to be complementary to the lock nut 76, wherein the tangential side walls 82, 84 of the head sleeve 60 formed by the undercut 78 immerse into corresponding transverse grooves 86, 88 and the two tangential projections 78 immerse into corresponding recesses 90 of the cracking lance 46. The sliding mandrel 52 is guided to be axially movable inside the cracking lance 46 via plain bearings, a central plain bearing being accessible via a bearing recess 92. The cracking tool 48 is pushed onto the cracking lance 46 in radial direction and is secured and the connecting bolt 80 is connected to the sliding mandrel 52 guaranteeing tensile strength, the rear end section 94 axially projecting from the cracking lance 46 being connected to the cracking cylinder 54 via the coupling means 56.

Figure 5:
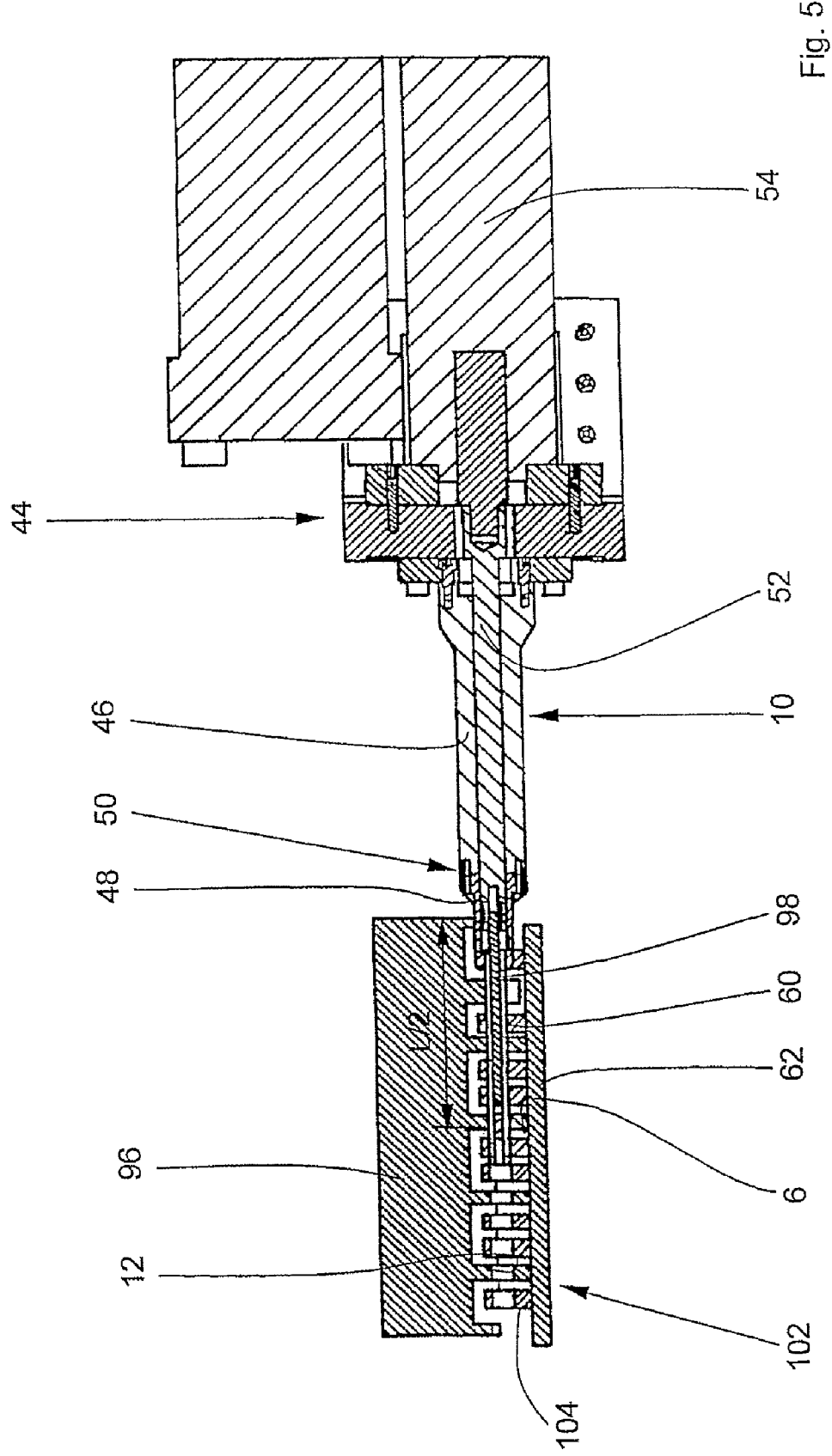
FIG. 5 is a sectional view of a further embodiment of a cracking head for a camshaft channel.
Figure 6:
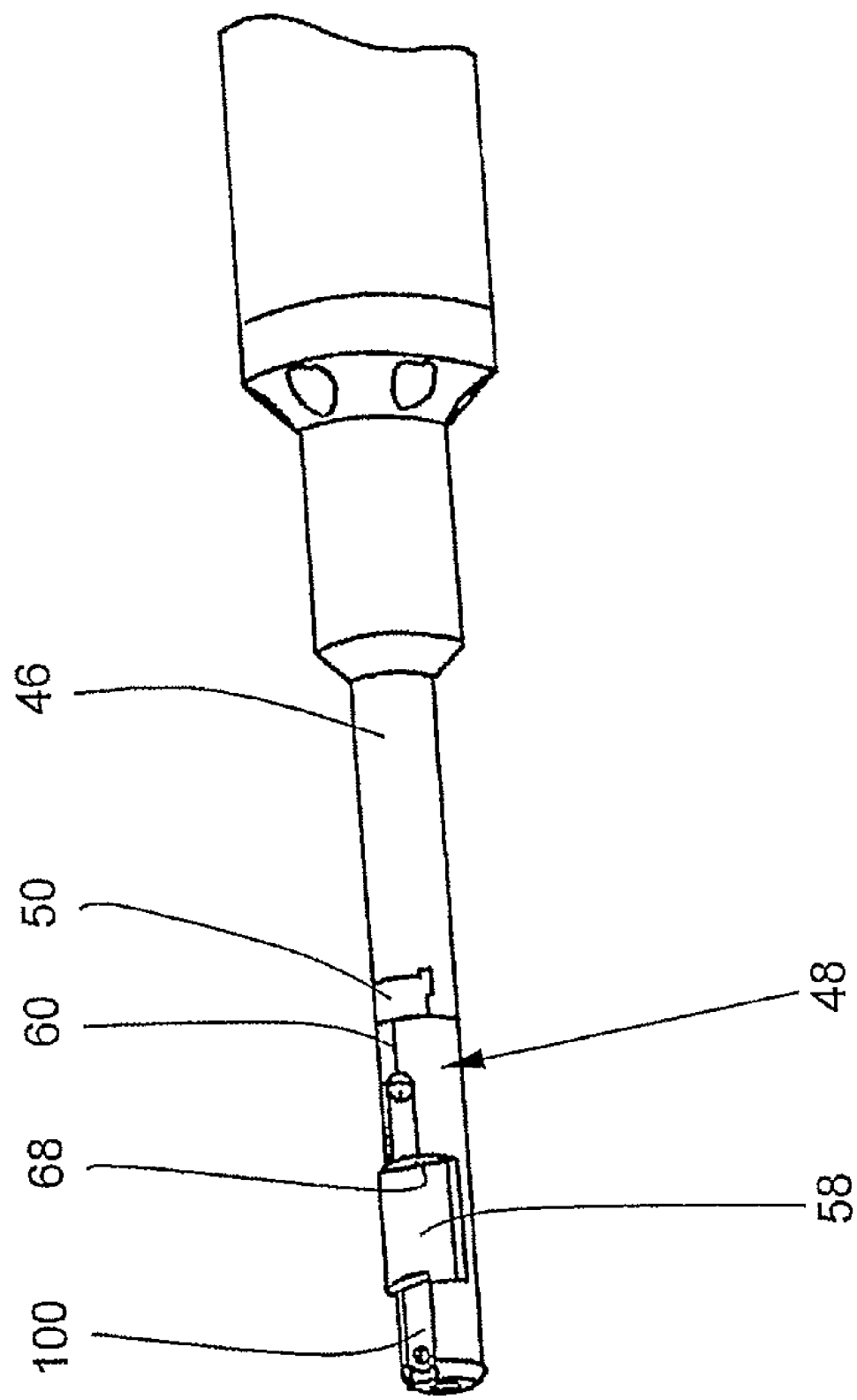
FIG. 6 shows a three-dimensional partial view of the cracking mandrel from FIG. 5.

By way of the FIGS. 5 and 6 another embodiment of the invention is illustrated, wherein in this cracking unit 1 a bearing channel of a camshaft housing 96 is to be separated by cracking. To simplify matters, in this embodiment merely the cracking head 44 including the camshaft housing 96 is shown. The other component parts of the cracking unit 1 correspond to the afore-described embodiment as regards the basic structure, wherein merely an adaptation to the geometry of the camshaft housing 96 has to be made.

The cracking unit 1 shown in FIG. 5 likewise comprises a cracking cylinder 54 via which a cracking mandrel 10 can be actuated which substantially consists of a cracking lance 46, a cracking tool 48 axially attached thereto and a sliding mandrel 52 connected to the cracking cylinder 54 guaranteeing tensile strength. As the bearing holes 12 of the camshaft bearing channel have a substantially smaller diameter than the bearing holes 12 of a crankcase 4, the cracking tool 48 must be appropriately designed to have a smaller outer diameter. The basic structure of the cracking tool substantially corresponds to the one shown in the FIGS. 2, 3 and 4. I.e. in the embodiment shown in FIG. 5, too, a wedge 62 is guided to be axially movable in a head sleeve 60 of the cracking tool 48, wherein due to the axial length of the cracking tool 48 the axial displacement of the sliding mandrel 52 is transmitted to the wedge 62 via a ram 98 connected to these component parts under tensile strength. As one can take especially from the three-dimensional partial view of the cracking mandrel 10 in FIG. 6, the cracking jaw 58 actuated by the wedge 62 is guided to be radially movable in a shell breakthrough 68 of the head sleeve 60 and is biased via a leaf spring arrangement 100 in the direction of the wedge surface of the wedge 62. The connection between the tool 48 and the cracking lance 46 is positive—as in the afore-described embodiment—, the cracking lance 46 or the cracking mandrel 10 being prevented from radially expanding in the area of the connection of the cracking tool 48 by an overlapping between the component parts.

Another difference of the embodiment represented in the FIGS. 5 and 6 from the embodiment described in the beginning consists in the fact that in the latter embodiment the axial length of the cracking lance 46 and of the cracking tool 48 corresponds approximately to the length L of the bearing channel (FIG. 2) so that all bearing covers 6 of the crankcase 4 according to the representation in FIG. 2 can be separated by cracking successively from the right to the left by insertion of the cracking mandrel 10.

In the embodiment shown in FIG. 5 only the outer diameter of the cracking tool 48 is adapted to the diameter of the bearing hole 12, the cracking lance 10 has a substantially larger diameter and cannot be introduced into the bearing hole 12. The axial length of the cracking tool 48 is designed to be approximately corresponding to half the axial length L/2 of the bearing channel 2 so that in the shown embodiment first the three bearing covers 6 located on the right in FIG. 5 are separated by cracking and then, after rotating the camshaft housing 96 about 180°, the two remaining bearing covers can be separated. By virtue of the comparatively small outer diameter of the cracking tool 48 and the relatively great length L of the camshaft housing 96 compared to that, a guiding means 102 is provided which has a plurality of guiding sections 104 arranged adjacent to the bearing sections subject to separation by cracking and permitting a radial guiding of the cracking tool 98 so that the separating operation by cracking can be carried out with high precision without the cracking tool 48 bending in radial direction.

For the rest, the configuration according to FIGS. 5 and 6 corresponds to the configuration described in the beginning so that further explanations can be dispensed with.

The applicant reserves the right to direct a separate independent claim to the structure of the cracking mandrel independently of the geometry of the cracking unit and the overhead clamping of the housing, which claim is directed to the geometry of the connection 50.

In the above-described embodiments the bearing cover 6 is secured by its bearing screws 26 in a predetermined position relative to the housing 4, 96. In an alternative solution the screwing of the bearing screws 26 is renounced so that the counter bracket 30 acts directly upon the end face of the bearing cover 6. The bearing covers 6 loosened after separation by cracking are collected by a basket or receptacle disposed below in the area of the clamping means 24, the basket being provided with positioning pins that keep the bearing cover 6 in a predetermined relative position. This basket may be fixed to the housing 4 or may be part of a conveying means by which the housing 4 or the housing cover is moved between the working stations.

The applicant further reserves the right to direct a separate independent claim to the design of the counter brackets through which the screwdrivers of a screwing unit pass, which claim can also be used for variants in which the housing is not clamped at the top thereof.

There is disclosed a method and a cracking unit for separating a bearing channel of a housing by cracking, said housing being clamped at the top thereof such that the bearing sections to be separated by cracking are downwardly oriented towards a supporting surface.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

The invention claimed is:

1. A method for separating a bearing channel of a housing by cracking, wherein bearing covers of the bearing channel are separated from the housing by cracking by means of a cracking mandrel, comprising the steps of:
    clamping the housing at a top thereof so that the bearing channel is downwardly oriented towards a supporting or clamping surface and
    supporting the bearing cover during separation by cracking by means of a counter bracket,
    wherein the bearing covers are screwed with the housing before separation by cracking and the bearing cover is supported on the screws screwing the bearing covers with the housing during separation by cracking.

2. A method according to claim 1, wherein before the separating operation by cracking a particular play is adjusted at the screwing of the bearing cover subject to separation by cracking, while the screwing of the other bearing covers not to be separated by cracking remains tightened.

3. A method according to claim 2, wherein the screwing is tightened after separation by cracking.

4. A method according to claim 1, wherein the screwing is made through the counter bracket.

5. A method according to claim 1, wherein below the bearing covers a basket is arranged to collect the bearing covers separated by cracking at a predetermined position relative to the bearing channel.

6. A method according to claim 5, wherein the basket is fixed to the housing.

7. A method according to claim 5, wherein the basket is used as container for the housing.

8. A cracking unit for a bearing channel of a housing comprising
    a clamping means for clamping the housing at a top thereof;
    counter brackets for supporting bearing covers of bearing channels during a separating operation by cracking;
    a cracking mandrel for separating the bearing covers by cracking from a bearing block;
    wherein the bearing covers are screwed with the housing before separation by cracking, and wherein the counter bracket acts upon screw heads of the bearing cover to be separated and is spaced apart from the other screw heads of the bearing channel.

9. A cracking unit according to claim 8, comprising a screwing unit for adjusting bearing screws before and/or after separation by cracking.

10. A cracking unit according to claim 8, wherein a screwdriver extends through the counter bracket to the respective screw head.

11. A cracking unit according to claim 8, comprising a basket for collecting and holding the bearing covers at a predetermined position relative to the housing.

12. A cracking unit according to claim 8, wherein the cracking mandrel has a multi-part design and the connection between the cracking mandrel parts is made positive by radial insertion, wherein radially outer side walls of a cracking tool overlap and engage behind a central section of a cracking lance.

13. A cracking unit according to claim 12, wherein a cracking jaw of the cracking tool is biased by a spring arrangement into a home position and is radially extendible into its cracking position by a slide means.

14. A cracking unit according to claim 12, wherein a free working length of the cracking mandrel corresponds approximately to the single or half of a bearing length (L).

15. A cracking unit according to claim 12, comprising a push-off tool which can be attached to an end face of the cracking tool for releasing a blocked cracking jaw.

16. A cracking unit according to claim 12, comprising a guide means for the cracking mandrel immersing between bearing blocks of the bearing channel.

17. A cracking unit according to claim 12, wherein the housing is a crankcase or a camshaft housing.

18. A cracking unit according to claim 8, comprising a laser for introducing a separating notch by cracking.

* * * * *